United States Patent
Sako et al.

(10) Patent No.: US 9,926,428 B2
(45) Date of Patent: Mar. 27, 2018

(54) CALCIUM CARBONATE FILLER FOR RESIN AND RESIN COMPOSITION INCLUDING SAID FILLER

(71) Applicant: MARUO CALCIUM CO., LTD., Akashi-shi (JP)

(72) Inventors: Kouhei Sako, Akashi (JP); Hidemitsu Kasahara, Akashi (JP)

(73) Assignee: MARUO CALCIUM CO., LTD., Akashi-shi (JP)

( * ) Notice: Subject to any disclaimer, the term of this patent is extended or adjusted under 35 U.S.C. 154(b) by 45 days.

(21) Appl. No.: 15/116,013

(22) PCT Filed: Feb. 20, 2015

(86) PCT No.: PCT/JP2015/054714
§ 371 (c)(1),
(2) Date: Aug. 2, 2016

(87) PCT Pub. No.: WO2015/129560
PCT Pub. Date: Sep. 3, 2015

(65) Prior Publication Data
US 2017/0174864 A1    Jun. 22, 2017

(30) Foreign Application Priority Data
Feb. 28, 2014    (JP) .................. 2014-038442

(51) Int. Cl.
C08K 3/26    (2006.01)
C08L 67/02    (2006.01)
(Continued)

(52) U.S. Cl.
CPC ............ *C08K 3/26* (2013.01); *C01F 11/18* (2013.01); *C08K 9/04* (2013.01); *C09C 1/021* (2013.01); *C01P 2004/51* (2013.01); *C01P 2004/62* (2013.01); *C01P 2006/12* (2013.01); *C01P 2006/37* (2013.01); *C01P 2006/62* (2013.01); *C01P 2006/64* (2013.01);
(Continued)

(58) Field of Classification Search
CPC ..... C01F 11/18; C01F 11/181; C01P 2006/12; C01P 2006/60; C01P 2006/62; C01P 2006/90; C08K 3/26; C08K 2003/265
See application file for complete search history.

(56) References Cited

U.S. PATENT DOCUMENTS 6,143,065 A * 11/2000 Freeman ................. C01F 11/18
106/464
7,341,704 B2 * 3/2008 Kasahara ............... B82Y 30/00
423/419.1
(Continued)

FOREIGN PATENT DOCUMENTS

JP    2004-210631 A  *  7/2004    ............ C01F 11/18
JP    2005-336417 A  *  12/2005   ............ C09C 1/02
(Continued)

*Primary Examiner* — Rip A Lee
(74) *Attorney, Agent, or Firm* — Kratz, Quintos & Hanson, LLP

(57) ABSTRACT

Provided is a calcium carbonate filler which gives films and the like excellent in moldability, dispersibility, gasmark (bubbles), hue, and further, excellent in optical properties such as reflectivity and light resistance when incorporated into a resin to prepare a resin composition.

14 Claims, 1 Drawing Sheet

(51) Int. Cl.
  *C08K 9/04* (2006.01)
  *C01F 11/18* (2006.01)
  *C09C 1/02* (2006.01)
(52) U.S. Cl.
  CPC .... *C01P 2006/90* (2013.01); *C08K 2003/265* (2013.01); *C08K 2201/005* (2013.01); *C08K 2201/006* (2013.01); *C08L 67/02* (2013.01)

(56) References Cited

U.S. PATENT DOCUMENTS

| | | | | |
|---|---|---|---|---|
| 8,747,543 | B2* | 6/2014 | Smith | C01F 11/18 106/464 |
| 8,975,322 | B2* | 3/2015 | Kasahara | C08K 3/26 423/430 |
| 2008/0168925 | A1* | 7/2008 | Sare | C01F 11/18 106/462 |
| 2014/0000485 | A1* | 1/2014 | Smith | C01F 11/18 106/464 |
| 2014/0024761 | A1* | 1/2014 | Kasahara | C08K 3/26 524/425 |
| 2016/0130764 | A1* | 5/2016 | Esko | D21H 17/675 428/402 |

FOREIGN PATENT DOCUMENTS

| | | | | |
|---|---|---|---|---|
| JP | 2009-263224 A | * | 11/2009 | ............ C01F 11/18 |
| JP | 2010-228940 A | * | 10/2010 | ............ C01F 11/18 |
| WO | WO 2014/058057 A1 | * | 4/2014 | ............ C08K 3/26 |

* cited by examiner

CALCIUM CARBONATE FILLER FOR RESIN AND RESIN COMPOSITION INCLUDING SAID FILLER

TECHNICAL FIELD

The present invention relates to a calcium carbonate filler for a resin, and a resin composition containing the filler, and more particularly to a calcium carbonate filler for a resin, having a particle diameter adjusted to a predetermined value and having high lightness and thermal stability, and a resin composition in which the filler is incorporated.

The calcium carbonate filler for a resin of the present invention has extremely high lightness and enables a resin composition having an excellent hue to be obtained not only in a case where the filler is used for a conventional sealant, a flooring material, an adhesive, and, of course, a plastisol, in which the filler is incorporated at a high concentration, but also in a case where the filler is incorporated into, for example, a resin such as a polyester resin and an engineering resin having a high processing temperature.

Furthermore, since the calcium carbonate filler for a resin of the present invention contains extremely less fine powders and coarse particles, and is excellent in uniformity and dispersibility of particles, it is useful, particularly, as a micropore forming agent for white PET (polyethylene terephthalate) used in a light reflection plate for a liquid crystal of a portable telephone, a notebook computer, a television, and the like.

BACKGROUND ART

Conventionally, calcium carbonate has been incorporated at a high concentration for use of plastisol in which a vinyl chloride resin or an acrylic resin and a plasticizer are mixed, and in the field of a sealant in which a urethane or a silicone resin, a polysulfide resin, and the like, are mixed. On the other hand, among synthetic resins, in the field in which a processing temperature is high, for example, a polyester resin typically such as a polyethylene terephthalate (PET), an engineering plastic typically such as a polyamide (PA), a polycarbonate (PC), and a polyphenylene sulfide (PPS), calcium carbonate has previously been incorporated in a very small amount for the purpose of a light diffusing material, an anti-blocking material, and the like.

For example, there has been proposed a method of adding calcium carbonate whose particle size has been adjusted as a micropore forming agent together with a non-compatible resin into a PET resin, and forming the mixture into a stretched film (sheet) (Patent Literature 1), a method of adding inorganic fine particles such as barium sulfate particles into a PET resin, and forming the mixture into a stretched film (sheet) (Patent Literature 2), and the like. A porous white PET film produced by a method of forming porous voids at an interface between a PET resin and a micropore forming agent has been put into practical use in a wide variety of fields such as a synthetic paper, (prepaid) cards, labels, optical reflecting films (sheets), and the like. Among them, for example, in the case of a light reflecting film utilized for liquid crystal TV, high image quality, wide screen, and low cost of liquid crystal TV are required.

CITATION LISTS

Patent Literature

Patent Literature 1: JP S62-207337 A
Patent Literature 2: JP 2005-125700 A

SUMMARY OF THE INVENTION

Technical Problem

When calcium carbonate is compared with other micropore forming agents such as an organic non-compatible resin, barium sulfate, and titanium oxide, calcium carbonate not only is more inexpensive, but also has higher heat resistance as compared with the organic non-compatible resin. Therefore, for example, there is also a merit in that an edge portion (selvage portion) which is generated in manufacturing of a white PET film can be recycled, and is also advantageous in respect of the environment and a yield.

Furthermore, barium sulfate and titanium oxide have a specific gravity of about 4 to 4.5 $g/cm^3$, while a specific gravity of calcium carbonate is low such as about 2.7 $g/cm^3$, and thus, an addition weight can be decreased to about ⅔, resulting in advantage in respect of the cost and weight saving. Therefore, a white porous resin film with calcium carbonate incorporated therein is demanded.

However, calcium carbonate to be incorporated into the white PET resin needs relatively large particles whose BET specific surface area is 1 to 10 $m^2/g$, thus degrading the degree of whiteness (lightness) in view of the hue of powder, and thus degrading optical performance. Therefore, incorporation of calcium carbonate at a high concentration has previously been a problem to be solved.

In view of the circumstances mentioned above, in order to solve the above-mentioned problems, it is an object of the present invention to provide a resin composition, in particular, a resin composition which is capable of being incorporated in a resin having a high processing temperature at a high concentration, and which maintains an excellent degree of whiteness.

Solution to Problem

The present inventors have intensively studied in order to solve the above-mentioned problems and have found that calcium carbonate, whose BET specific surface area, weight reduction value, and degree of whiteness have been adjusted to predetermined values, is excellent in thermal stability, and can provide a resin composition having less degradation of the hue in the resin and having high light-reflection property even if it is incorporated at a high concentration and kneaded into a resin whose processing temperature is high, resulting in completion of the present invention.

That is to say, a feature of the present invention lies in a calcium carbonate filler for a resin, satisfying the following expressions (a), (b), and (c):

$$1.0 \leq Sw \leq 10.0 \ (m^2/g), \quad (a)$$

$$0.01 \leq Tw \leq 0.5 (\% \text{ by weight}), \quad (b)$$

and $$80 \leq Lw \leq 90 \quad (c)$$

wherein
Sw represents a BET specific surface area ($m^2/g$) measured by using a BET specific surface area measuring device (Macsorb manufactured by Mountech Co., Ltd.);
Tw represents a weight reduction value (% by weight) measured at 200° C. to 300° C. by using a differential thermogravimetric device (Thermo Plus EVO II manufactured by Rigaku Corporation); and Lw represents a degree of whiteness (L value) measured by using a spectroscopic color difference meter (ZE-2000 manufactured by Nippon Denshoku Industries Co., Ltd.).

Another feature of the present invention is a calcium carbonate filler for a resin, further satisfying the following expression (d):

$$2 \leq bw \leq 7 \quad (d)$$

wherein bw represents a degree of yellowness (b value) measured by using a spectroscopic color-difference meter (ZE-2000 manufactured by Nippon Denshoku Industries Co., Ltd.).

A still another feature of the present invention is a calcium carbonate filler for a resin, further satisfying the following expressions (e), (f), and (g):

$$Dmo \leq 30 (\% \text{ by volume}), \quad (e)$$

$$Dms5/Dmv5 \leq 3.0, \quad (f)$$

and $$Dmr \leq 5.0 (\% \text{ by volume}) \quad (g)$$

wherein
Dmo represents a content rate (% by volume) of particles having a particle diameter of 0.26 μm or less in a volume particle size distribution measured by using a laser diffraction type particle size distribution measurement device (Microtrac MT-3300EX II manufactured by Nikkiso Co., Ltd.);
Dms5 represents a 5% diameter (μm) accumulated from a small particle side in a volume particle size distribution measured by using a laser diffraction type particle size distribution measurement device (Microtrac MT-3300EX II manufactured by Nikkiso Co., Ltd.);
Dmv5 represents a 5% diameter (μm) accumulated from a small particle side in a number particle size distribution of particle diameters measured under an electron microscope (Mac-VIEW manufactured by Mountech); and
Dmr represents a content rate (% by volume) of particles having a particle diameter of 3 μm or more in a volume particle size distribution measured by using a laser diffraction type particle size distribution measurement device (Microtrac MT-3300EX II manufactured by Nikkiso Co., Ltd.).

A yet another feature of the present invention is a calcium carbonate filler for a resin, which is subjected to surface treatment with an organophosphorus surface treating agent.

A further feature of the present invention is a resin composition including a resin and the above-mentioned calcium carbonate filler for a resin.

A further feature of the present invention is that the above-mentioned resin is a polyester resin.

A further feature of the present invention is that the above-mentioned polyester resin is light-reflecting polyethylene terephthalate.

A further feature of the present invention is the resin composition which is a film.

Advantageous Effects of Invention

A calcium carbonate filler for a resin of the present invention includes calcium carbonate particles whose specific surface area and a reduction value (amount of volatile components) are adjusted to predetermined values and which have high whiteness. The calcium carbonate filler does not cause a problem of degradation of the hue even if it is incorporated and kneaded into a resin having a high processing temperature at a high concentration. Therefore, in particular, the calcium carbonate filler for a resin of the present invention is particularly useful in optical fields, for example, a light reflection plate for a liquid crystal which requires reflectivity and light resistance, and a lamp reflector which requires an adhering force to a metal film and glossiness, and the like.

DESCRIPTION OF EMBODIMENTS

Figure 1:
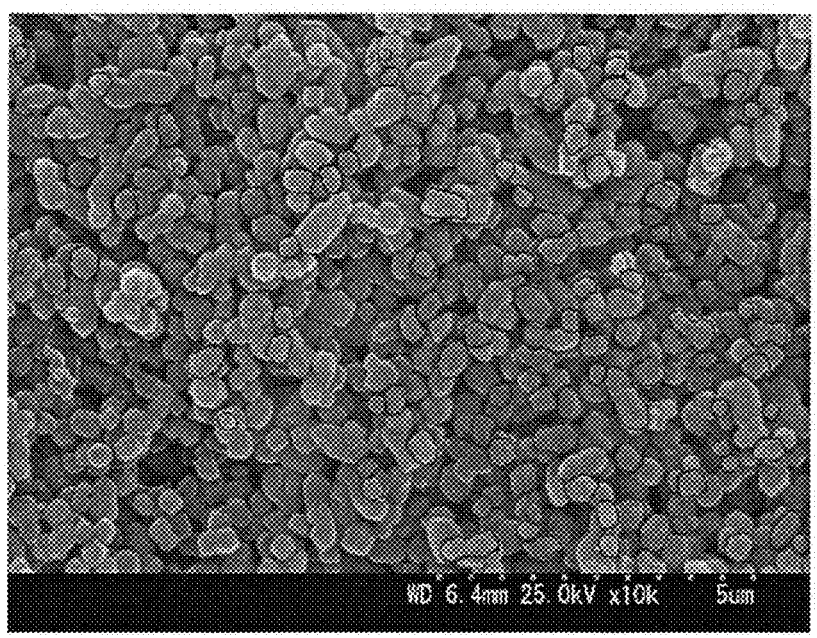
FIG. 1 is a photograph showing an electron microscope (SEM) diameter of a calcium carbonate filler for a resin obtained in Example 5.

A calcium carbonate filler for a resin of the present invention (hereinafter, merely referred to as a calcium carbonate filler) satisfies the following expressions (a), (b), and (c):

$$1.0 \leq Sw \leq 10.0 \ (m^2/g), \quad (a)$$

$$0.01 \leq Tw \leq 0.5 (\% \text{ by weight}), \quad (b)$$

and $$80 \leq Lw \leq 90 \quad (c)$$

wherein,
Sw represents a BET specific surface area ($m^2/g$) measured by using a BET specific surface area measuring device (Macsorb manufactured by Mountech Co., Ltd.);
Tw represents a weight reduction value (% by weight) measured at 200° C. to 300° C. by using a differential thermogravimetric device (Thermo Plus EVO II manufactured by Rigaku Corporation); and
Lw represents a degree of whiteness (L value) measured by using a spectroscopic color-difference meter (ZE-2000 manufactured by Nippon Denshoku Industries Co., Ltd.).

The expression (a) of the present invention represents an individual size of the calcium carbonate filler as a BET specific surface area (Sw), and it needs to be 1.0 to 10.0 $m^2/g$. When Sw exceeds 10.0 $m^2/g$, the amount of volatile components such as water contained in calcium carbonate becomes large, thus causing a problem in degassing at the time of kneading of a resin. On the other hand, when Sw is less than 1.0 $m^2/g$, when it is incorporated into the resin, a particle of the calcium carbonate filler is large, thus making it difficult to mix the particle with the resin uniformly. Furthermore, even when they can be mixed with each other, there is a problem that the calcium carbonate filler drops from a resin molded body. Furthermore, when the calcium carbonate filler is used as a micropore forming agent for a light reflecting film mentioned above, there is also a problem that a diameter of the micropore becomes too large. Therefore, Sw is more preferably 2.0 to 9.0 $m^2/g$, and further more preferably 3.0 to 8.0 $m^2/g$.

A measurement method of a BET specific surface area Sw using the BET specific surface area measuring device (Macsorb manufactured by Mountech) is as follows.
<Measurement Method of BET Specific Surface Area>
Calcium carbonate fillers in the amount of 0.2 to 0.3 g were set to a measuring device, and subjected to heat treatment as pre-treatment at 200° C. for 5 minutes under the atmosphere of a mixed gas of nitrogen and helium. Thereafter, low-temperature low-humidity physical adsorption was carried out under the environment of liquid nitrogen so as to measure a specific surface area.

The expression (b) of the present invention represents a weight reduction value (Tw) (amount of volatile components) measured at 200° C. to 300° C. by using a differential thermogravimetric device (Thermo Plus EVO II manufactured by Rigaku Corporation), and the value needs to be 0.01 to 0.5% by weight. When Tw exceeds 0.5% by weight, the amount of volatile components such as water contained in calcium carbonate is large, thus causing a problem in degassing at the time of kneading of a resin and a problem of the hue. When the calcium carbonate filler is used as the micropore forming agent for a light reflecting film mentioned above, degradation of the light reflection property may be caused. On the other hand, the lower limit value is not particularly limited, but an appropriate value is 0.01% by weight in consideration of the degree at which the load is not too large for an operation property in view of crystalline stability, and the like. Therefore, the value is more preferably 0.03 to 0.4% by weight, and further more preferably 0.05 to 0.3% by weight.

A measurement method of the weight reduction value Tw by using the differential thermogravimetric device (Thermo Plus EVO II manufactured by Rigaku Corporation) is as follows.

<Measurement Method of Weight Reduction Value>

Calcium carbonate fillers in the amount of 20 to 30 mg were weighed into a platinum pan having a diameter of 5 mm, and set to the differential thermogravimetric device. A temperature was increased at a temperature-raising speed of 30° C./min, and the weight reduction value at 200° C. to 300° C. was measured.

The expression (c) of the present invention represents a degree of whiteness (Lw) measured by using a spectroscopic color-difference meter (ZE-2000 manufactured by Nippon Denshoku Industries Co., Ltd.), and the value needs to be 80 to 90. When Lw is less than 80, when the calcium carbonate filler is used for a light reflecting film mentioned above, the degree of whiteness of the film is also deteriorated, and desired reflectivity cannot be obtained. On the other hand, the upper limit value of Lw is not particularly limited. However, to exceed 90, coloring metal such as iron, manganese, nickel, and chromium in the calcium carbonate needs to be removed to the limit. In consideration of the degree at which the load is not too large for an operation property, an appropriate value is 90. Therefore, the value is more preferably in the range from 81 to 88, and further more preferably in the range from 82 to 86.

Furthermore, it is preferable that the degree of yellowness (bw) (b value) measured by using the above-mentioned spectroscopic color-difference meter satisfies the following expression (d):

$$2 \leq bw \leq 7. \tag{d}$$

When bw exceeds 7, since the resin is also easily changed to be yellow, use for a light reflecting film mentioned above may cause a problem in adjustment of light color. On the other hand, the lower limit value of bw is appropriately 2 in consideration of the degree at which the load is not too large for an operation property in terms of removal of foreign matter. Therefore, the value is more preferably 2 to 6, and further more preferably 2 to 5.

The measurement methods of the degree of whiteness (Lw) and the degree of yellowness (bw) by using the spectroscopic color-difference meter (ZE-2000 manufactured by Nippon Denshoku Industries Co., Ltd) are as follows.

<Measurement Methods of Degree of Whiteness and Degree of Yellowness>

A calcium carbonate filler and dioctyl phthalate (DOP) as plasticizer were mixed at a ratio of 1:2 in a deaerator so as to prepare paste. Then, an L value as the degree of whiteness (lightness) (Lw), and a b value as the degree of yellowness (bw) were output in comparison with those of the Standard white plate (P6004) by using the above-mentioned spectroscopic color-difference meter. The degree of whiteness (Lw) has higher value as the calcium carbonate filler is whiter, and the degree of yellowness (bw) has higher value as the degree of yellowness of the calcium carbonate filler is higher.

When the above-mentioned three requirements are satisfied, the purpose of the calcium carbonate filler of the present invention can be sufficiently achieved. However, in order to obtain a more sufficient effect, it is further preferable that the following expressions (e), (f), and (g) are satisfied.

$$Dmo \leq 30(\% \text{ by volume}), \tag{e}$$

$$Dms5/Dmv5 \leq 3.0, \tag{f}$$

and $$Dmr \leq 5.0(\% \text{ by volume}) \tag{g}$$

wherein

Dmo represents a content rate (% by volume) of particles having a particle diameter of 0.26 μm or less in a volume particle size distribution measured by using a laser diffraction type particle size distribution measurement device (Microtrac MT-3300EX II manufactured by Nikkiso Co., Ltd.);

Dms5 represents a 5% diameter (μm) accumulated from a small particle side in a volume particle size distribution measured by using a laser diffraction type particle size distribution measurement device (Microtrac MT-3300EX II manufactured by Nikkiso Co., Ltd.);

Dmv5 represents a 5% diameter (μm) accumulated from a small particle side in a number particle size distribution in particle diameters measured under an electron microscope (Mac-VIEW manufactured by Mountech); and Dmr represents a content rate (% by volume) of particles having a particle diameter of 3 μm or more in a volume particle size distribution measured by using a laser diffraction type particle size distribution measurement device (Microtrac MT-3300EX II manufactured by Nikkiso Co., Ltd.).

In the above-mentioned expression (e), it is preferable that the content rate of particles having a particle diameter of 0.26 μm or less is 30% by volume or less in the volume particle size distribution measured by using the laser diffraction type particle size distribution measurement device (Microtrac MT-3300EX II manufactured by Nikkiso Co., Ltd.). When the content rate of the particles exceeds 30% by volume, when being kneaded with resin, degassing of volatile components such as water contained in the surface of calcium carbonate becomes difficult. In addition to this, water is easily adsorbed from the outside air so that aggregation of calcium carbonates becomes stronger. Thus, it is likely to be difficult to use the calcium carbonate filler for the purpose and application of the present invention. Therefore, the content rate is more preferably 25% by volume or less, and further more preferably 20% by volume or less. The lower limit value is not particularly limited, but it is preferably a lower value and the most preferably 0% by volume.

A measurement method of the volume particle size distribution Dmo by using the laser diffraction type particle size distribution measurement device (Microtrac MT-3300EX II manufactured by Nikkiso Co., Ltd.) is as follows.

<Measurement Method of Volume Particle Size Distribution>

As a medium, methanol is used. Before measurement, in order to make suspending of the calcium carbonate filler for a resin of the present invention constant, 0.1 to 0.3 g of calcium carbonate filler and 60 ml of methanol solvent are added and suspended as pre-treatment in a beaker (100 ml), and the filler is preliminarily dispersed under the constant condition of electric current of 300 µA for one minute using a chip-type ultrasonic dispersing machine (US-300T; manufactured by NIHONSEIKI KAISHA LTD.), and thereafter, a measured value is obtained.

The above-mentioned expression (f) represents a value obtained by dividing the 5% diameter (Dms5) (hereinafter, also referred to as a laser diffraction diameter) by the 5% diameter (Dmv5) (hereinafter, also referred to as an electron microscope diameter), and the obtained value is preferably 3.0 or less. The 5% diameter (Dms5) is a value accumulated from a small particle side in a volume particle size distribution measured by using a laser diffraction type particle size distribution measurement device (Microtrac MT-3300EX II manufactured by Nikkiso Co., Ltd.). The 5% diameter (Dmv5) is a value accumulated from a small particle side in a number particle size distribution in a particle diameter measured under an electron microscope (Mac-VIEW manufactured by Mountech).

As mentioned above, as the size of the primary particle is finer, the particle retains a larger amount of water and an aggregation adhering force easily becomes stronger. Therefore, since an aggregation-adhered secondary aggregate or tertiary aggregate is counted as one particle in a commercially available laser diffraction type particle size distribution measurement device, a diameter of the primary particle observed from an electron microscope-observed image is accurately counted and measured one by one, so as to obtain a ratio of respective 5% diameters with respect to a laser diffraction diameter and an electron microscope diameter accumulated from a small particle side.

When the above-mentioned expression (f) exceeds 3.0, that is, when a difference between the laser diffraction diameter and the electron microscope diameter is great, the content rate of fine particles is large. Therefore, the expression (f) is preferably 2.0 or less, and more preferably 1.5 or less. The lower limit value is preferably near 1.0, and the most preferably 1.0.

A method for measuring a laser diffraction particle size by a laser diffraction type particle size distribution measurement device (Microtrac MT-3300EX II manufactured by Nikkiso Co., Ltd.) is as mentioned above. Furthermore, a method for measuring an electron microscope diameter by Mac-VIEW manufactured by Mountech is as follows.

<Measurement Method of Electron Microscope Diameter>

Into a beaker (100 ml), 1 to 3 g of calcium carbonate filler and 60 g of methanol solvent are added and suspended, and preliminarily dispersed under the constant condition of electric current of 300 µA for one minute, using a chip type ultrasonic dispersing machine (US-300T; manufactured by NIHONSEIKI KAISHA LTD.). Then, the dispersion is thinly and uniformly placed on a SEM sample stage using a 0.5 mil-dropping pipet, and is dried so as to prepare a sample.

After the prepared sample is observed under SEM (scanning microscope) at such magnification that 100 to 500 pieces can be counted, contours of 100 to 500 particles are traced and counted in an order from an edge, using a commercially available image analysis type particle size distribution measurement software (Mac-VIEW manufactured by Mountech), to obtain the Heywood diameter (corresponding to a projected area diameter). The particle size distribution is number frequency, and 30% or less denotes number % per 100 to 500 pieces.

Examples of the electron microscope-observed image are not particularly limited, and include a SEM (scanning electron microscope) image, a TEM (transmission electron microscope) image, and an electric field emission image thereof. The SEM image was used in the present invention.

The above-mentioned expression (g) represents a content rate of particles having a particle diameter of 3 µm or more in a volume particle size distribution measured by using a laser diffraction type particle size distribution measurement device (Microtrac MT-3300EX II manufactured by Nikkiso Co., Ltd.), and is preferably 5.0% by volume or less.

As mentioned above, when the calcium carbonate filler is applied to, for example, a micropore forming agent for a light reflecting film for liquid crystal television as the purpose and application of the present invention, when an amount of the calcium carbonate filler having a particle diameter of 3 µm or more is large, the filler is difficult to contribute to reflectivity in view of the property of the light reflectivity. Therefore, the content rate is more preferably 3.0% by volume or less, and more preferably 1.5% by volume or less.

A measurement method of the volume particle size distribution by the laser diffraction type particle size distribution measurement device (Microtrac MT-3300EX II manufactured by Nikkiso Co., Ltd.) is as mentioned above.

As calcium carbonate used in the present invention, from the viewpoint of degassing property at the time of kneading with a resin, and the hue, calcium carbonate prepared by a synthesis method of firing natural gray dense limestone is used more preferable than calcium carbonate prepared by a pulverization method from natural white saccharoidal limestone (heavy calcium carbonate) that contains a large amount of fine powders or impurities. This is preferable because a synthesized product (light or colloidal calcium carbonate) prepared by a synthesis method can be uniformly controlled and impurities can be relatively removed.

However, calcium carbonate including limestone containing coloring metallic oxides of iron, and manganese, and the like, as raw material at high content has a function of making the hue of powder yellowish. Since the content of the coloring metallic oxide is different depending upon production places thereof, it is preferable to select limestone of a production place, which contains extremely few above-mentioned impurity metal. It is difficult to uniformly determine specific content of impurity metal because the content is different depending upon the types of the coloring metal or states of oxide. However, for the purpose and application of the present invention, the iron content is preferably 100 ppm or less, and more preferably 50 ppm or less. Furthermore, the manganese content is preferably 20 ppm or less, and more preferably 10 ppm or less. These contents are measured by using an atomic absorption spectrophotometer (AA-677: manufactured by Shimadzu Corporation).

Furthermore, as a crystal form of the synthesized product, from the viewpoint of the crystalline stability, the product including calcite as a main component is preferable.

A method for manufacturing calcium carbonate particles is a generally known carbonation process. In this method, a limemilk obtained by adding water to quicklime obtained by firing limestone and a carbonic acid gas generated during firing are reacted. Slurry that has been reacted in the carbonation process is further subjected to Ostwald aging to allow the BET specific surface area to be adjusted to a desirable value. Furthermore, the pH of the slurry after aging is not particularly limited, but it is usually 7 to 10. When pH of the slurry exceeds 10, remaining alkaline materials such as calcium hydroxide easily increase Tw (thermal reduction), deteriorate the resin, and decompose the resin.

On the other hand, when the pH of the slurry is less than 7, the hue is easily degraded due to oxidization. Therefore, it is preferable that conduction of carbonic acid gas is carried out preferably in the range of pH 7.5 to 9.5, and more preferably in the range of 8.0 to 9.0.

Meanwhile, the synthesis method of colloidal calcium carbonate is the same as that of light calcium carbonate. However, the shapes are different from each other, that is, the former has a colloidal shape and the latter has a spindle shape. Furthermore, for example, in use for paper making, calcium carbonate that can be used for the application without dropping from pulp is called light calcium carbonate, and calcium carbonate that cannot be used due to dropping is called colloidal calcium carbonate. In this way, both are distinguished from each other.

In the purpose and application of the present invention, since the light calcium carbonate is an aggregate particle, it is unsuitable to optical application. On the other hand, the colloidal calcium carbonate is preferable because it includes less fine particles and coarse particles and is excellent in uniformity of particles.

The calcium carbonate filler of the present invention can be surface-treated (covered) with various surface treating agents if necessary for the purpose of improving the fluidity of powders, alkali resistance, hue, and other properties of the calcium carbonate filler. The surface treating agent is not particularly limited, and examples thereof include an organic phosphorus or inorganic phosphoric acid surface treating agent, a polycarboxylic acid surface treating agent, a coupling agent type surface treating agent, and the like. These can be used for surface treatment singly or in combination of two or more thereof if necessary.

Examples of the organic phosphorus acid surface treating agent include phosphates such as 1-hydroxyethylidene-1,1-diphosphonic acid (HEDP), nitrilotrismethylenephosphonic acid (NTMP), trimethyl phosphate (TMP), triethyl phosphate (TEP), tributyl phosphate (TBP), triphenyl phosphate (TPP), methyl acid phosphate (MAP), and ethyl acid phosphate (EAP), and salts thereof. Examples of the inorganic phosphoric acid surface treating agent include condensed phosphoric acid typically such as pyrophoric acid and polyphosphoric acids, hexametaphosphoric acid and salts thereof. The surface treatment agents may be used singly or in combination of two or more thereof.

Examples of the polycarboxylic acid surface treatment agent include monocarboxylic acids such as polyacrylic acid, methacrylic acid, and crotonic acid, and dicarboxylic acids such as itaconic acid, maleic acid, and fumaric acid. The surface treatment agents may be used singly or in combination of two or more thereof. A copolymer with a compound having a functional group such as polypropylene glycol (PPG) and polyethylene glycol (PEG) can be used without any problem.

Examples of the coupling agent surface treatment agent include silane coupling agents such as vinyltrimethoxysilane and N-2-(aminoethyl)-3-aminopropyltrimethoxysilane, titanate coupling agents typically such as isopropyltriisostearoyl titanate, and silicone oil typically such as methyl hydrogen silicone. The surface treatment agents may be used singly or in combination of two or more thereof.

Among the surface treatment agents, from the viewpoints of compatibility to a resin, heat resistance, inactivation of calcium carbonate, and dehydration and degassing property, trimethyl phosphate (TMP), triethyl phosphate (TEP), condensed phosphoric acids, and a silicone treatment agent are preferred. In particular, in the case of a polyester resin having an ester bond, since alkali resistance is low, the above-mentioned surface treatment agents are suitable.

An amount of the surface treatment agent to be used varies depending on the specific surface area of calcium carbonate, a compound condition, and the like. Therefore, it is difficult to unconditionally define the amount. However, it is preferable that the amount is usually 0.01 to 5% by weight with respect to calcium carbonate from the purpose and application of the present invention. The amount to be used of less than 0.01% by weight makes it difficult to achieve a sufficient surface treatment effect. On the other hand, addition of the surface treatment agent in an amount of more than 5% by weight may cause a problem that the hue of a resin turns yellow due to decomposition and volatilization of the surface treatment agent at the time of kneading with a resin. Therefore, the amount is more preferably 0.05 to 3% by weight, and more preferably 0.1 to 1.5% by weight.

A method for surface-treating calcium carbonate may be, for example, a dry treatment method for directly mixing the surface treatment agent with a calcium carbonate powder using a mixer such as a super mixer, a Henschel mixer, a tumbler mixer, a kneader mixer and a Banbury mixer, and if necessary, heating the mixture to carry out surface treatment; a wet treatment method for dissolving the surface treatment agent in a water solvent and the like, and surface-treating by adding the solution to an aqueous calcium carbonate suspension while heating if necessary, followed by dehydration and drying; or a method combining the both treatment methods in which a cake obtained by dehydration of the aqueous calcium carbonate suspension is surface-treated.

Next, the resin composition of the present invention will be described below.

A resin used in the present invention may be, of course, various resins having low processing temperature, but a resin having relatively high processing temperature is suitable. Examples of the resin may include general-purpose resins typically such as acrylic resin (PMMA), polyvinyl alcohol (PVA), polyvinylidene chloride (PVDC), polybutadiene (PBD) and polyethylene terephthalate (PET); engineering plastics such as polyacetal (POM), polyamide (PA), polycarbonate (PC), modified polyphenylene ether (PPE), polybutylene terephthalate (PBT), ultra high molecular weight polyethylene (UHPE), polysulfone (PSF), polyether sulfone (PES), polyphenylene sulfide (PPS), polyarylate (PAR), polyether ether ketone (PEEK), polyimide (PI), polyether imide (PEI), fluororesin (FR), and liquid crystal polymer (LCP); and thermosetting resins such as phenol, urea, melamine, alkyd, unsaturated polyester, epoxy, diallyl phthalate, polyurethane, modified silicone, polysulfide, reactive acryl, polyisobutylene, silylated urethane, and modified epoxy. Furthermore, biodegradable plastics such as polylactic acid resin, polybutylene succinate, polyamide 11, and polyhydroxybutyric acid, or biomass plastics can be also used.

Among them, polyester resins such as PET, PBT, PEN, PC and LCP, having an ester bond, have high versatility as sheet and film processed products, and PET is particularly suitable for the purpose and application of the present invention.

An incorporating ratio of the calcium carbonate filler of the present invention to a resin considerably varies depending on the types and applications of the resin, desired physical properties and cost, and may be appropriately determined depending on them. However, from the purpose of incorporation at a high concentration, for example, when used as a porous film for light reflection, the ratio is usually 10 to 100 parts by weight, more preferably 20 to 80 parts by weight, and further preferably 30 to 60 parts by weight with respect to 100 parts by weight of the resin. When the ratio of a calcium carbonate filler exceeds 100 parts by weight, degradation in kneading with resin or deterioration of resin may easily cause degradation of the hue (degree of whiteness). On the other hand, when the ratio is less than 10 parts by weight, sufficient light reflection property may not be able to be achieved.

Furthermore, in order to improve the properties of the resin composition, if necessary, within a range not impairing efficacy of the resin composition of the present invention, a lubricant such as fatty acid amide, ethylenebisstearic acid amide, and sorbitan fatty acid ester, a plasticizer, a stabilizer, an antioxidant, and the like, may be added. Furthermore, additives generally used in a resin composition for a film, for example, a lubricant, an antioxidant, a fluorescent brightening agent, a thermal stabilizer, a light stabilizer, an ultraviolet radiation absorber, a neutralizer, an antifogging agent, an antiblocking agent, an antistatic agent, a slipping agent, and a coloring agent may be incorporated.

When the calcium carbonate filler of the present invention and various additives are incorporated into a resin, they are mixed using a known mixer such as a super mixer, a Henschel mixer, a tumbler mixer, or a ribbon blender.

The resin composition is mixed by using a mixer, and then heat-kneaded using a monoaxial or biaxial extruder, a kneader mixer, a Banbury mixer, or the like, to produce once pellets containing various additives including the calcium carbonate filler of the present invention, which are referred to as master batch. The pellets are melted using a known molding machine such as T-die extruder or inflation molding, to form a film. Thereafter, if necessary, the film may be monoaxially or biaxially stretched to form a film product having a uniform micro pore diameter.

Furthermore, if necessary, a plurality of steps until T-die extrusion can be combined in the above-mentioned steps to form a film into a multilayer structure during extrusion; or to introduce a step of bonding films together in stretching, and stretching the films again to form a multilayer film; or to carry out film aging at a temperature condition in which a temperature is higher than normal temperature and lower than the melting temperature of a resin.

Furthermore, for the purpose of imparting printability to the above-mentioned film, a film surface may be subjected to surface treatment with plasma discharge or the like, so as to be coated with an ink-receiving layer, or an organic solvent, as a coating liquid, of heat-resistant resin such as aromatic para-aramid, polyphenylene sulfide (PPS), and polyether ether ketone (PEEK) resin may be applied onto at least one side of the film to form a protective layer.

Furthermore, the calcium carbonate filler of the present invention may be dissolved in hydrochloric acid or the like that dissolves calcium carbonate and a surface treatment agent to form a porous film product having only micropores.

EXAMPLES

Hereinafter, the present invention will be described specifically with reference to Examples and Comparative Examples. However, the present invention is not limited to the Examples and Comparative Examples.

Example 1

Quicklime obtained by firing with kerosene as a heat source in a coma furnace type kiln was dissolved in gray dense limestone (Fe content: 48 ppm and Mn content: 2 ppm) from a production place A so as to prepare a slaked lime slurry having a volume of 1000 L, a specific gravity of 1.040 and a temperature of 30° C. Subsequently, carbon dioxide having purity of 99% or more was allowed to pass through the slurry at a gas flow rate of 50 $m^3$/hour to synthetize calcium carbonate. A BET specific surface area at the time was 12.4 $m^2$/g. Water slurry of the calcium carbonate was subjected to particle growth by Ostwald aging to obtain a calcium carbonate water slurry having a BET specific surface area of 10.4 $m^2$/g and pH 8.5. The resultant calcium carbonate water slurry was dehydrated and dried by using a filter press machine and a flash dryer.

Next, trimethyl phosphate (TMP) in an amount corresponding to 1.0% by weight with respect to calcium carbonate was subjected to dry treatment using a Henschel mixer at a treatment temperature of 120° C., followed by classification using a precise air classifier (turbo classifier) to prepare a calcium carbonate filler. Powder physical properties of the obtained calcium carbonate filler and the main implementation conditions are shown in Table 1.

Example 2

A calcium carbonate filler was prepared by a process carried out in the same conditions as in Example 1 except that calcium carbonate water slurry having a BET specific surface area of 8.1 $m^2$/g and pH 8.8 was obtained by particle growth through Ostwald aging so as to prepare a dried powder, and, thereafter, trimethyl phosphate (TMP) in an amount corresponding to 1.0% by weight with respect to calcium carbonate was treated using a Henschel mixer. The powder physical properties of the obtained calcium carbonate filler and the main implementation conditions are shown in Table 1.

Example 3

A calcium carbonate filler was prepared by a process carried out in the same conditions as in Example 1 except that calcium carbonate water slurry having a BET specific surface area of 5.6 $m^2$/g and pH 8.3 was obtained by particle growth through Ostwald aging so as to prepare a dried powder, and, thereafter, trimethyl phosphate (TMP) in an amount corresponding to 1.0% by weight with respect to calcium carbonate was treated using a Henschel mixer. The powder physical properties of the obtained calcium carbonate filler and the main implementation conditions are shown in Table 1.

Example 4

A calcium carbonate filler was prepared by a process carried out in the same conditions as in Example 1 except that calcium carbonate water slurry having a BET specific surface area of 3.4 $m^2$/g and pH 8.6 was obtained by particle growth through Ostwald aging, and an ethyl acid phosphate (EAP) ammonia neutralization product in an amount corresponding to 0.5% by weight was treated using a tumbler mixer. The powder physical properties of the obtained calcium carbonate filler and the main implementation conditions are shown in Table 1.

Example 5

A calcium carbonate filler was prepared by a process carried out in the same conditions as in Example 1 except that calcium carbonate water slurry having a BET specific surface area of 5.6 m²/g and pH 8.5 was obtained by particle growth through Ostwald aging, and dehydrated and pressed, and thereafter, trimethyl phosphate (TMP) in an amount corresponding to 1.0% by weight with respect to calcium carbonate was treated using a kneader mixer, followed by drying by using an electric heating dryer. The powder physical properties of the obtained calcium carbonate filler and the main implementation conditions are shown in Table 1. Furthermore, an observation photograph of an electron microscope (SEM) diameter (magnifications of ×10,000) is shown in FIG. 1.

Example 6

A calcium carbonate filler was prepared by a process carried out in the same conditions as in Example 5 except that the surface treating agent was changed to methyl hydrogen silicone oil in an amount corresponding to 0.3% by weight. The powder physical properties of the obtained calcium carbonate filler and the main implementation conditions are shown in Table 1.

Example 7

A calcium carbonate filler was prepared by a process carried out in the same conditions as in Example 5 except that two types of surface treating agents, that is, polyacrylic acid ammonium in an amount corresponding to 0.3% by weight and trimethyl phosphate (TMP) in an amount corresponding to 1.0% by weight were used in combination for treatment. The powder physical properties of the obtained calcium carbonate filler and the main implementation conditions are shown in Table 1.

Example 8

A calcium carbonate filler was prepared by a process carried out in the same conditions as in Example 5 except that two types of surface treating agents, that is, pyrophoric acid in an amount corresponding to 0.3% by weight and trimethyl phosphate (TMP) in an amount corresponding to 1.0% by weight were used in combination for treatment. The powder physical properties of the obtained calcium carbonate filler and the main implementation conditions are shown in Table 1.

Example 9

A calcium carbonate filler was prepared by a process carried out in the same conditions as in Example 5 except that slaked lime slurry was prepared by assimilating a commercially available high purity calcium oxide reagent (manufactured by Wako Pure Chemical Industries, Ltd., 99.9%). The powder physical properties of the obtained calcium carbonate filler and the main implementation conditions are shown in Table 1.

Example 10

A calcium carbonate filler was prepared by a process carried out in the same conditions as in Example 3 except that surface treatment was not carried out in Example 3. The powder physical properties of the obtained calcium carbonate filler and the main implementation conditions are shown in Table 1.

Example 11

A calcium carbonate filler was prepared by a process carried out in the same conditions as in Example 5 except that gray dense limestone from a production place B (Fe content: 51 ppm, and Mn content: 16 ppm) was used. The powder physical properties of the obtained calcium carbonate filler and the main implementation conditions are shown in Table 1.

Example 12

A calcium carbonate filler was prepared by a process carried out in the same conditions as in Example 5 except that gray dense limestone from a production place C (Fe content: 103 ppm, and Mn content: 21 ppm) was used. The powder physical properties of the obtained calcium carbonate filler and the main implementation conditions are shown in Table 1.

Example 13

A calcium carbonate filler was prepared by a process carried out in the same conditions as in Example 5 except that calcium carbonate water slurry having a BET specific surface area of 5.6 m²/g and pH 7.6 was obtained by particle growth through Ostwald aging. The powder physical properties of the obtained calcium carbonate filler and the main implementation conditions are shown in Table 1.

Example 14

A calcium carbonate filler was prepared by a process carried out in the same conditions as in Example 5 except that calcium carbonate water slurry having a BET specific surface area of 5.6 m²/g and pH 6.8 was obtained by particle growth through Ostwald aging. The powder physical properties of the obtained calcium carbonate filler and the main implementation conditions are shown in Table 1.

Comparative Example 1

A calcium carbonate filler was prepared by a process carried out in the same conditions as in Example 5 except that a surface treating agent was changed to sodium hexametaphosphate (commercially available product) and a mixed fatty acid soap (surface-active agent) in amounts corresponding to 0.67% by weight and 2.0% by weight, respectively, for a calcium carbonate water slurry having a BET specific surface area of 6.0 m²/g and pH 8.5 as described in Example 3 of JP 2006-169421. The powder physical properties of the obtained calcium carbonate filler and the main implementation conditions are shown in Table 1.

Comparative Example 2

A calcium carbonate filler was prepared by a process carried out in the same conditions as in Example 5 except that 1300 g of manganese chloride tetrahydrate (reagent of Wako Pure Chemical Industries) was added to the slaked lime slurry in Example 5. The powder physical properties of the obtained calcium carbonate filler and the main implementation conditions are shown in Table 1.

Comparative Example 3

Commercially available heavy calcium carbonate (#2000, manufactured by MARUO CALCIUM CO., LTD.) was subjected to classification by using a precise fluid classifier to recover a coarse powder side. Then, trimethyl phosphate (TMP) in an amount corresponding to 0.5% by weight with respect to calcium carbonate was subjected to dry treatment using a Henschel mixer at a treatment temperature of 120° C. to prepare a calcium carbonate filler. The powder physical properties of the obtained calcium carbonate filler and the main implementation conditions are shown in Table 1.

Figure 2:
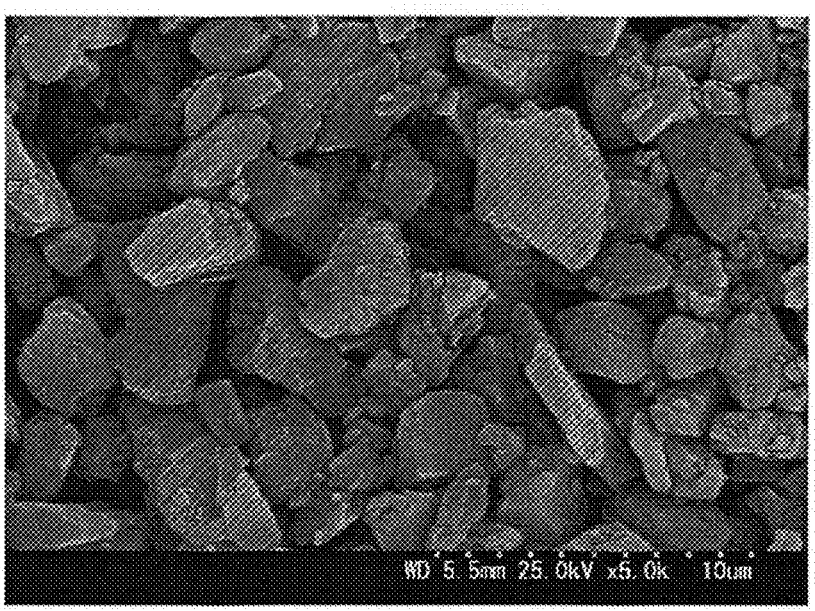
FIG. 2 is a photograph showing an electron microscope (SEM) diameter of a calcium carbonate filler for a resin obtained in Comparative Example 3.

Furthermore, an observation photograph of an electron microscope (SEM) diameter (magnifications of ×5,000) is shown as FIG. 2. As compared with the calcium carbonate filler of Example 5 (FIG. 1), the calcium carbonate filler of Comparative Example 3 was observed to have a larger amount of fine powders.

Comparative Example 4

The synthesized calcium carbonate water slurry prepared in Example 1 before subjecting to Ostwald aging and having a BET specific surface area of 12.4 m$^2$/g and pH 11.0 was dehydrated and dried by using a filter press machine and a flash dryer.

Next, trimethyl phosphate (TMP) in an amount corresponding to 1.0% by weight with respect to calcium carbonate was subjected to dry treatment using a Henschel mixer at a treatment temperature of 120° C. to prepare a calcium carbonate filler. The powder physical properties of the obtained calcium carbonate filler and the main implementation conditions are shown in Table 1.

Comparative Example 5

A calcium carbonate filler was prepared by a process carried out in the same conditions as in Example 5 except that a calcium carbonate water slurry having a BET specific surface area of 0.7 m$^2$/g and pH 8.5 was obtained by particle growth through Ostwald aging, and trimethyl phosphate (TMP) was treated by using a Henschel mixer. The powder physical properties of the obtained calcium carbonate filler and the main implementation conditions are shown in Table 1.

TABLE 1

| Calcium carbonate filler | | 1 | 2 | 3 | 4 | 5 | 6 | 7 | 8 | 9 | 10 |
|---|---|---|---|---|---|---|---|---|---|---|---|
| | | | | | Examples | | | | | | |
| (a) Sw | (m$^2$/g) | 9.6 | 7.3 | 5.4 | 3.1 | 4.9 | 4.9 | 4.9 | 4.9 | 4.9 | 4.9 |
| (b) Tw | (wt %) | 0.21 | 0.18 | 0.16 | 0.14 | 0.15 | 0.17 | 0.32 | 0.21 | 0.15 | 0.13 |
| (c) Lw | — | 85 | 84 | 84 | 83 | 84 | 84 | 83 | 85 | 87 | 84 |
| (d) bw | — | 2.8 | 3.0 | 3.0 | 3.2 | 3.1 | 2.9 | 3.5 | 3.0 | 1.7 | 2.8 |
| (e) Dmo | (vol %) | 23 | 11 | 2.0 | 0 | 0 | 0 | 0 | 0 | 0 | 1 |
| (f) Dms5/Dmv5 | — | 1.2 | 1.3 | 1.3 | 1.4 | 1.3 | 1.3 | 1.3 | 1.6 | 1.3 | 1.3 |
| (g) Dmr | (vol %) | 0.1 | 0.2 | 0.3 | 0.5 | 0.4 | 0.4 | 0.4 | 0.7 | 0.4 | 0.6 |
| Surface treating agent | — | TMP | TMP | TMP | EAP AMM | TMP | SIO | PA-AMM, TMP | PYR, TMP | TMP | — |
| Content | (wt %) | 1.0 | 1.0 | 1.0 | 0.5 | 1.0 | 0.3 | 0.3, 1.0 | 0.3, 1.0 | 1.0 | — |
| Calcium carbonate | | Syn | Syn | Syn | Syn | Syn | Syn | Syn | Syn | Syn | Syn |
| pH of slurry | | 8.5 | 8.8 | 8.3 | 8.6 | 8.5 | 8.5 | 8.5 | 8.5 | 8.5 | 8.3 |
| pH of powder | | 9.7 | 9.5 | 9.3 | 9.1 | 9.2 | 9.2 | 8.6 | 8.6 | 9.2 | 9.8 |
| Fe content | (ppm) | 48 | 48 | 48 | 48 | 48 | 48 | 48 | 48 | <1 | 48 |
| Mn content | (ppm) | 2 | 2 | 2 | 2 | 2 | 2 | 2 | 2 | <1 | 2 |

| Calcium carbonate filler | | Examples | | | | Comparative Examples | | | | |
|---|---|---|---|---|---|---|---|---|---|---|
| | | 11 | 12 | 13 | 14 | 1 | 2 | 3 | 4 | 5 |
| (a) Sw | (m$^2$/g) | 4.9 | 4.9 | 4.9 | 4.9 | 5.1 | 4.9 | 3.8 | 11.3 | 0.7 |
| (b) Tw | (wt %) | 0.15 | 0.15 | 0.15 | 0.15 | 1.2 | 0.15 | 0.1 | 0.51 | 0.10 |
| (c) Lw | — | 81 | 80 | 83 | 82 | 81 | 78 | 77 | 85 | 79 |
| (d) bw | — | 5.1 | 6.8 | 3.5 | 4.5 | 3.5 | 7.5 | 4.5 | 2.6 | 4.2 |
| (e) Dmo | (vol %) | 0 | 0 | 0 | 0 | 0 | 0 | 45 | 44 | 0 |
| (f) Dms5/Dmv5 | — | 1.3 | 1.3 | 1.3 | 1.3 | 1.4 | 1.3 | 5.4 | 1.3 | 2.3 |
| (g) Dmr | (vol %) | 0.4 | 0.4 | 0.4 | 0.4 | 0.4 | 0.4 | 5.7 | 0.0 | 31 |
| Surface treating agent | — | TMP | TMP | TMP | TMP | HMP-Na, MFAS | TMP | TMP | TMP | TMP |
| Content | (wt %) | 1.0 | 1.0 | 1.0 | 1.0 | 0.67, 2.0 | 1.0 | 0.5 | 1.0 | 1.0 |
| Calcium carbonate | | Syn | Syn | Syn | Syn | Syn | Syn | Nat | Syn | Syn |
| pH of slurry | | 8.5 | 8.5 | 7.6 | 6.8 | 8.5 | 8.5 | — | 11 | 8.5 |
| pH of powder | | 9.2 | 9.2 | 9.2 | 9.2 | 10.5 | 9.2 | 9.6 | 11.0 | 9.1 |
| Fe content | (ppm) | 51 | 103 | 48 | 48 | 48 | 48 | 87 | 48 | 48 |
| Mn content | (ppm) | 16 | 21 | 2 | 2 | 2 | 34 | 21 | 2 | 2 |

TMP: trimethyl phosphate
EAP: ethyl acid phosphate
AMM: ammonium
SIO: silicone oil
PA-AMM polyacrylic acid ammonium
PYR: pyrophoric acid
HMP-Na: sodium hexametaphosphate
MFAS: mixed fatty acid soap
Syn: synthesized
Nat: natural Examples 15 to 28, and Comparative Examples 6 to 10

White PET Resin Film

After 70 parts by weight of polyethylene terephthalate (PET) (manufactured by QUADRANT POLYPENCO JAPAN LTD., specific gravity: 1.39) and 30 parts by weight of calcium carbonate filler were mixed with stirring by using a Henschel mixer to sufficiently disperse these components, the mixture was dried at 180° C. for three hours. Thereafter, the resultant was granulated at 280° C. by using a kneading extruder (LABO PLASTOMILL 2D25W, manufactured by Toyo Seiki Co., Ltd.) to form a pellet. The resultant pellet was dried again at 180° C. for three hours. Then, the pellet was extruded into a sheet-like form from a T-die at 290° C. by using a film extruder (LABO PLASTOMILL D2025-model, manufactured by Toyo Seiki Co., Ltd.), and cooled to be solidified in a 30° C. cooling drum to obtain a non-stretched film.

Then, the non-stretched film was heated to 95° C. and stretched 3.3 times in a MD direction (extruding direction), and the stretched film was further heated to 130° C. and stretched 3.7 times in a TD direction (lateral direction) by a tenter stretching machine to obtain a film having a thickness of 180 μm. Physical properties of the obtained film were evaluated by the following method and the evaluation results are shown in Table 2.

1) Stretchability of Film

Stable stretchability of a film during extrusion stretching of the film was observed and evaluated based on the following criteria.

⊚: An IV (intrinsic viscosity) value of pellet is in the range from 0.55 to 0.65 dl/g and stable, and a film discharge amount during extrusion stretching is also constant.

○: An IV (intrinsic viscosity) value of pellet is in the range from 0.50 to 0.55 dl/g and is slightly low, or in the range from 0.65 to 0.70 dl/g and slightly high, but a torque and a discharge amount during extrusion stretching are stable.

Δ: An IV (intrinsic viscosity) value of pellet is less than 0.50 dl/g, or more than 0.70 dl/g, so that a torque and a discharge amount during extrusion stretching are unstable, but film can be obtained.

X: An IV (intrinsic viscosity) value of pellet is out of the range from 0.50 to 0.70 dl/g, so that a torque and a discharge amount during extrusion stretching are unstable, and a film cannot be obtained.

2) Dispersibility of Particles

A fish eye caused by aggregates or coarse and large particles was visually observed on a film having a size of 300 mm×300 m, and evaluated based on the following criteria:

⊚: No fish eye is found.
○: One or two fish eye(s) is/are found.
Δ: Three or more and less than ten fish eyes are found.
X: Ten or more fish eyes are found.

3) Gas Mark

A gas mark (air bubble) due to a volatile component such as water was visually observed on a film having a size of 300 mm×300 m, and evaluated based on the following criteria:

⊚: No gas mark is found.
○: One or two gas mark(s) is/are found.
Δ: Three or more and less than ten gas marks are found.
X: Ten or more gas marks are found.

4) Hue

In the measurement method by a color-difference meter with respect to each of the obtained polyester films, an L value (Lp) as the degree of whiteness (lightness) and a b value (bp) as the degree of yellowness were output by using a spectroscopic color-difference meter (ZE-2000 manufactured by Nippon Denshoku Industries Co., Ltd.) in comparison with the those in the Standard white plate (P6004).

5) Reflectivity

Using an ultraviolet-visible spectroscopy (UV3101PC, manufactured by Shimadzu Corporation), reflectivity in a wavelength range of 0.30 to 0.80 μm was measured when reflectivity of a barium sulfate white plate is defined as 100%. Reflectivity at 0.45 μm was determined as a representative value. It can be said that as the reflectivity is higher, the more uniform void diameter is obtained in the above-mentioned wavelength range.

6) Light Resistance

Reflectivity after irradiation with light for 120 hours was measured using a solar simulator (YSS-50A; manufactured by Yamashita Denso Corporation). It can be said that as light resistance is higher, a light reflecting film is more stable.

TABLE 2

| White PET film | Examples | | | | | | | | | | | | | | Comparative Examples | | | | |
|---|---|---|---|---|---|---|---|---|---|---|---|---|---|---|---|---|---|---|---|
| | 15 | 16 | 17 | 18 | 19 | 20 | 21 | 22 | 23 | 24 | 25 | 26 | 27 | 28 | 6 | 7 | 8 | 9 | 10 |
| Example or Comp. Example No. of calcium carbonate filler | 1 | 2 | 3 | 4 | 5 | 6 | 7 | 8 | 9 | 10 | 11 | 12 | 13 | 14 | 1 | 2 | 3 | 4 | 5 |
| 1) Intrinsic viscosity (IV value) of pellets | Δ | ○ | ○ | ○ | ○ | ○ | ⊚ | ⊚ | ⊚ | Δ | ○ | ○ | ○ | ○ | Δ | ○ | X | Δ | ○ |
| 2) Dispersibility of particles | Δ | ○ | ⊚ | ⊚ | ⊚ | ⊚ | ⊚ | ⊚ | ⊚ | Δ | ⊚ | ⊚ | ⊚ | ⊚ | ○ | ⊚ | X | Δ | ⊚ |
| 3) Gas mark | Δ | ○ | ⊚ | ⊚ | ⊚ | ○ | ○ | ⊚ | ⊚ | Δ | ⊚ | ○ | ⊚ | ⊚ | X | ○ | X | X | ○ |
| 4) Hue Whiteness (Lp)value | 78 | 80 | 80 | 79 | 80 | 81 | 79 | 82 | 83 | 75 | 78 | 77 | 78 | 76 | 74 | 79 | 74 | 75 | 70 |
| Yellowness (bp)value | +1 | 0 | −1 | 0 | −2 | −1 | −1 | −2 | −3 | +3 | +2 | +3 | +1 | +2 | +4 | +8 | +3 | +2 | +3 |
| 5) Reflectivity | 93 | 94 | 97 | 96 | 98 | 97 | 98 | 99 | 101 | 91 | 93 | 91 | 93 | 92 | 88 | 82 | 78 | 85 | 77 |
| 6) Light resistance | 90 | 92 | 96 | 95 | 97 | 97 | 97 | 99 | 100 | 85 | 89 | 86 | 89 | 88 | 79 | 78 | 75 | 79 | 74 |

From Tables 1 and 2, white PET films of Examples 15 to 28 using calcium carbonate filler of Examples 1 to 14 satisfying the BET specific surface area (Sw) of (a), the weight reduction value (Tw) of (b), and the degree of whiteness (Lw) of (c) have excellent physical properties in the moldability, particle dispersibility, gas mark, and hue (degree of whiteness Lp and degree of yellowness bp) with high balance, and excellent reflectivity and light resistance.

On the other hand, in the white PET film of Comparative Example 6 using calcium carbonate of Comparative Example 1 in which the weight reduction value (Tw) of (b) is large, a large number of gas marks are found, and the Lp value is decreased and the bp value is increased in the hue, so that the reflectivity is degraded and light resistance is also degraded.

Furthermore, in the white PET film of Comparative Example 7 using a calcium carbonate filler of Comparative Example 2 in which addition of manganese chloride degraded the degree of whiteness (Lw) of (c), the bp value is increased in the hue, so that the reflectivity is degraded and light resistance is also degraded.

Furthermore, in the white PET film of Comparative Example 8 in which commercially available heavy calcium carbonate of Comparative Example 3 having a small degree of whiteness (Lw) of (c) is used as a filler, all of the hue (Lp and bp), the reflectivity, and the light resistance are degraded.

Furthermore, in the white PET film of Comparative Example 9 using a calcium carbonate filler of Comparative Example 4 in which the BET specific surface area (Sw) of (a) is large and the weight reduction value (Tw) of (b) is large, a large number of gas marks are found, and the reflectivity and the light resistance are degraded.

Furthermore, in the white PET film of Comparative Example 10 using a calcium carbonate filler of Comparative Example 5 in which the BET specific surface area (Sw) of (a) is small and the degree of whiteness (Lw) of (c) is small, Lp is degraded in the hue, and both the reflectivity and the light resistance are degraded.

INDUSTRIAL APPLICABILITY

As mentioned above, a calcium carbonate filler of the present invention can provide a film that is excellent in moldability, dispersibility, gas mark (air bubble), and hue when calcium carbonate filler is incorporated in a PET resin or the like, and excellent in physical properties such as the reflectivity and the light resistance.

The invention claimed is:

1. A calcium carbonate filler for a resin, satisfying the following expressions (a), (b), and (c):

$$1.0 \leq Sw \leq 10.0 \ (m^2/g), \quad (a)$$

$$0.01 \leq Tw \leq 0.5 (\% \ by \ weight), \quad (b)$$

and $$80 \leq Lw \leq 90 \quad (c)$$

wherein
Sw represents a BET specific surface area ($m^2/g$) measured by using a BET specific surface area measuring device;
Tw represents a weight reduction value (% by weight) measured at 200° C. to 300° C. by using a differential thermogravimetric device; and
Lw represents a degree of whiteness (L value) measured by using a spectroscopic color-difference meter.

2. The calcium carbonate filler for a resin according to claim 1, further satisfying the following expression (d):

$$2 \leq bw \leq 7 \quad (d)$$

wherein bw represents a degree of yellowness (b value) measured by using a spectroscopic color-difference meter.

3. The calcium carbonate filler for a resin according to claim 1, further satisfying the following expressions (e), (f), and (g):

$$Dmo \leq 30(\% \ by \ volume), \quad (e)$$

$$Dms5/Dmv5 \leq 3.0, \quad (f)$$

and $$Dmr \leq 5.0(\% \ by \ volume) \quad (g)$$

wherein
Dmo represents a content rate (% by volume) of particles having a particle diameter of 0.26 µm or less in a volume particle size distribution measured by using a laser diffraction type particle size distribution measurement device;
Dms5 represents a 5% diameter (µm) accumulated from a small particle side in a volume particle size distribution measured by using a laser diffraction type particle size distribution measurement device;
Dmv5 represents a 5% diameter (µm) accumulated from a small particle side in a number particle size distribution of particle diameters measured under an electron microscope; and
Dmr represents a content rate (% by volume) of particles having a particle diameter of 3 µm or more in a volume particle size distribution measured by using a laser diffraction type particle size distribution measurement device.

4. The calcium carbonate filler for a resin according to claim 2, further satisfying the following expressions (e), (f), and (g):

$$Dmo \leq 30(\% \ by \ volume), \quad (e)$$

$$Dms5/Dmv5 \leq 3.0, \quad (f)$$

and $$Dmr \leq 5.0(\% \ by \ volume) \quad (g)$$

wherein
Dmo represents a content rate (% by volume) of particles having a particle diameter of 0.26 µm or less in a volume particle size distribution measured by using a laser diffraction type particle size distribution measurement device;
Dms5 represents a 5% diameter (µm) accumulated from a small particle side in a volume particle size distribution measured by using a laser diffraction type particle size distribution measurement device;
Dmv5 represents a 5% diameter (µm) accumulated from a small particle side in a number particle size distribution of particle diameters measured under an electron microscope; and
Dmr represents a content rate (% by volume) of particles having a particle diameter of 3 µm or more in a volume particle size distribution measured by using a laser diffraction type particle size distribution measurement device.

5. The calcium carbonate filler for a resin according to claim 1, which is subjected to surface treatment with an organophosphorus surface treating agent.

6. The calcium carbonate filler for a resin according to claim 2, which is subjected to surface treatment with an organophosphorus surface treating agent.

7. The calcium carbonate filler for a resin according to claim 3, which is subjected to surface treatment with an organophosphorus surface treating agent.

8. The calcium carbonate filler for a resin according to claim 4, which is subjected to surface treatment with an organophosphorus surface treating agent.

9. A resin composition including a resin and the calcium carbonate filler for a resin according to claim 1.

10. The resin composition according to claim 9, wherein the resin is a polyester resin.

11. The resin composition according to claim 10, wherein the polyester resin is light-reflecting polyethylene terephthalate.

12. The resin composition according to claim 9, which is a film.

13. The resin composition according to claim 10, which is a film.

14. The resin composition according to claim 11, which is a film.

* * * * *